(12) United States Patent
Crochu et al.

(10) Patent No.: US 10,850,720 B2
(45) Date of Patent: Dec. 1, 2020

(54) VEHICLE BRAKING SYSTEM AND BRAKING METHOD

(71) Applicant: FAIVELEY TRANSPORT AMIENS, Amiens (FR)

(72) Inventors: Candice Crochu, Amiens (FR); Claudino Goncalves, Ribeaucourt (FR); Jérémie Sales, Amiens (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 185 days.

(21) Appl. No.: 16/080,762

(22) PCT Filed: Mar. 1, 2017

(86) PCT No.: PCT/FR2017/050461
§ 371 (c)(1),
(2) Date: Aug. 29, 2018

(87) PCT Pub. No.: WO2017/149244
PCT Pub. Date: Sep. 8, 2017

(65) Prior Publication Data
US 2019/0092299 A1 Mar. 28, 2019

(30) Foreign Application Priority Data

Mar. 4, 2016 (FR) ..................................... 16 51829

(51) Int. Cl.
*B60T 13/26* (2006.01)
*B61H 5/00* (2006.01)
(Continued)

(52) U.S. Cl.
CPC .......... *B60T 13/266* (2013.01); *B60T 13/665* (2013.01); *B60T 17/083* (2013.01); *B60T 17/086* (2013.01);
(Continued)

(58) Field of Classification Search
CPC .... B60T 13/266; B60T 13/665; B60T 17/228; B60T 17/16; B61H 5/00; B61H 13/00; B61H 13/20; B61H 15/00; F16D 55/2245
See application file for complete search history.

(56) References Cited

U.S. PATENT DOCUMENTS

| 4,018,140 A | * | 4/1977 | Engle | ....................... B61H 5/00 92/31 |
| 4,575,159 A | * | 3/1986 | Emilsson | ................ B60T 13/38 303/57 |

(Continued)

FOREIGN PATENT DOCUMENTS

| EP | 2154040 A1 | 2/2010 |
| EP | 2 202 122 A1 | 6/2010 |

(Continued)

OTHER PUBLICATIONS

International Search Report, dated Jun. 27, 2017 from corresponding PCT application No. PCT/FR2017/050461.

*Primary Examiner* — Vishal R Sahni
(74) *Attorney, Agent, or Firm* — Christopher R. Carroll; The Small Patent Law Group LLC

(57) ABSTRACT

Disclosed is a railway braking system including a first pneumatic distribution device formed by a first distributor provided with a single inlet opening connected to a source for supplying pneumatic pressure mediums and with a single outlet opening connected to a parking brake chamber in order to optionally supply a parking brake with a second pneumatic pressure medium so as to place the brake in either of inoperative and operative configurations, and a second pneumatic distribution device formed by a second distributor provided with a single inlet opening connected to the supply source and with a single outlet opening connected to a service pressure chamber in order to supply a service brake with a third pneumatic pressure medium of which the (Continued)

pressure value is predetermined, so as to apply a predetermined braking force when the parking brake is in the operative configuration thereof.

20 Claims, 5 Drawing Sheets

(51) Int. Cl.

| | | |
|---|---|---|
| *B60T 13/66* | (2006.01) | |
| *B60T 17/08* | (2006.01) | |
| *B60T 17/16* | (2006.01) | |
| *B60T 17/22* | (2006.01) | |
| *F16D 55/224* | (2006.01) | |
| *B61H 13/00* | (2006.01) | |
| *B61H 13/20* | (2006.01) | |
| *F16D 127/06* | (2012.01) | |
| *B61H 15/00* | (2006.01) | |
| *F16D 121/04* | (2012.01) | |
| *F16D 121/14* | (2012.01) | |
| *F16D 125/64* | (2012.01) | |

(52) U.S. Cl.
CPC ............ *B60T 17/16* (2013.01); *B60T 17/228* (2013.01); *B61H 5/00* (2013.01); *B61H 13/00* (2013.01); *B61H 13/20* (2013.01); *F16D 55/2245* (2013.01); *B61H 15/00* (2013.01); *F16D 2121/04* (2013.01); *F16D 2121/14* (2013.01); *F16D 2125/64* (2013.01); *F16D 2127/06* (2013.01)

(56) References Cited

U.S. PATENT DOCUMENTS

| | | | |
|---|---|---|---|
| 6,311,808 B1* | 11/2001 | Halasy-Wimmer | B60R 25/08 188/106 F |
| 7,905,556 B2* | 3/2011 | Huber | B60T 13/261 188/170 |
| 8,251,189 B2 | 8/2012 | Goncalves | |
| 9,956,971 B2* | 5/2018 | Gerber-Papin | B61H 13/00 |
| 2016/0082939 A1* | 3/2016 | Cole | B60T 15/184 303/8 |
| 2019/0092306 A1* | 3/2019 | Goncalves | B60T 13/665 |

FOREIGN PATENT DOCUMENTS

| | | | |
|---|---|---|---|
| WO | 2012/038277 A2 | | 3/2012 |
| WO | WO2013181707 | * | 12/2013 |
| WO | 2014/026936 A1 | | 2/2014 |

* cited by examiner

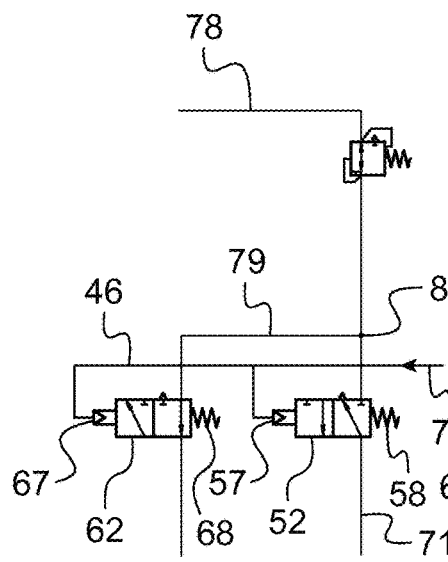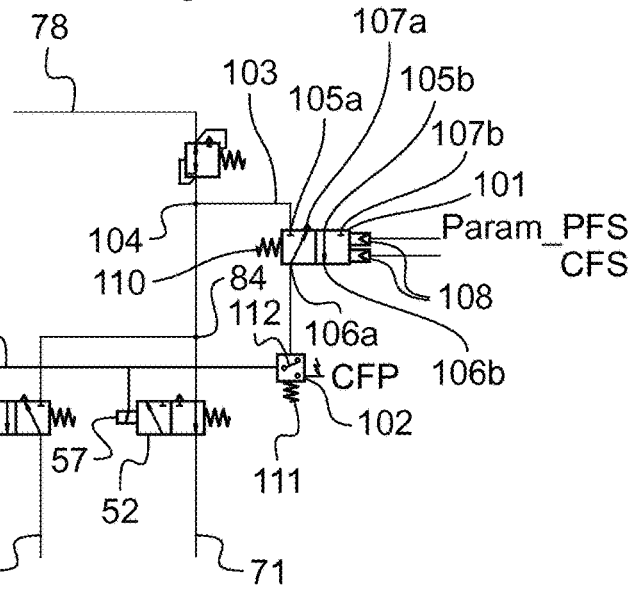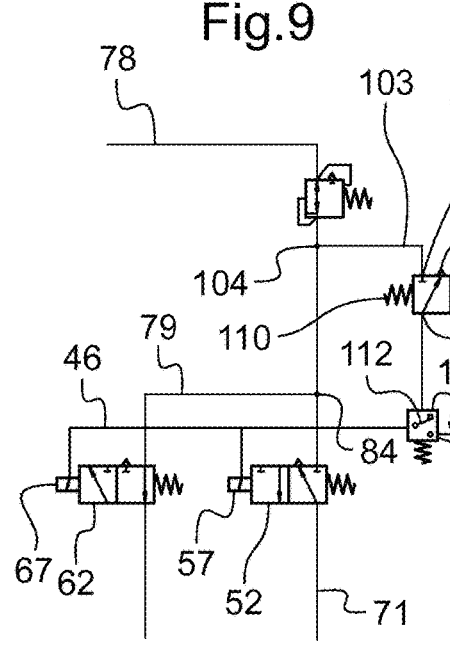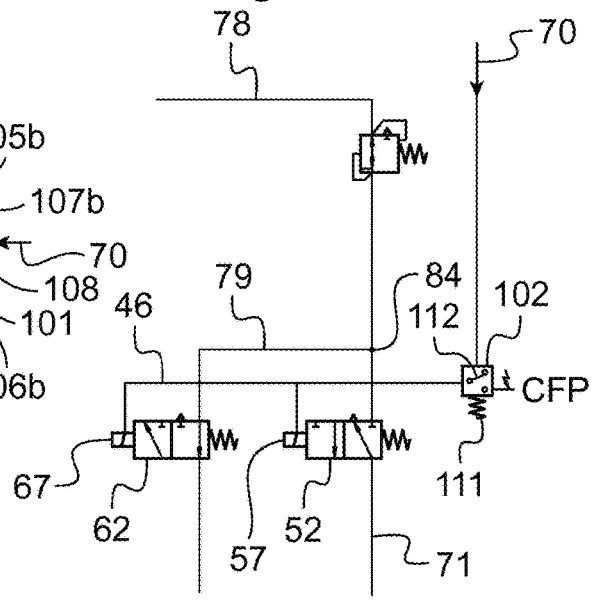

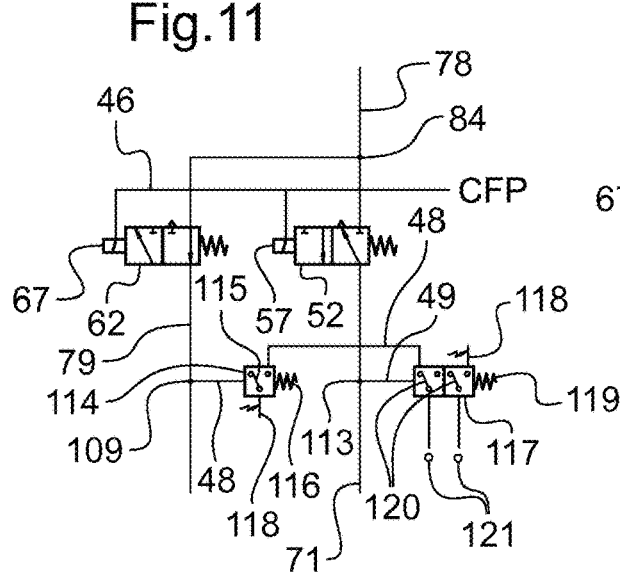
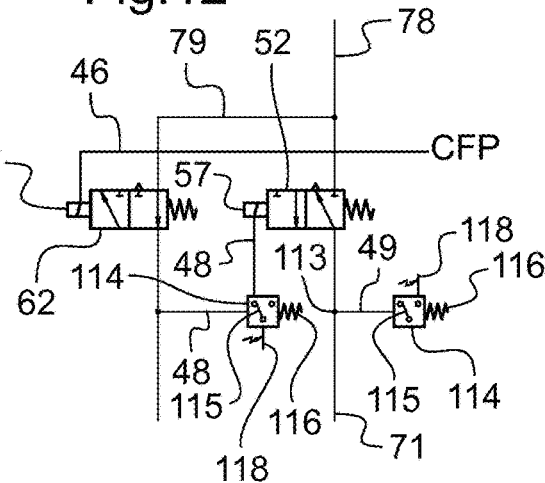
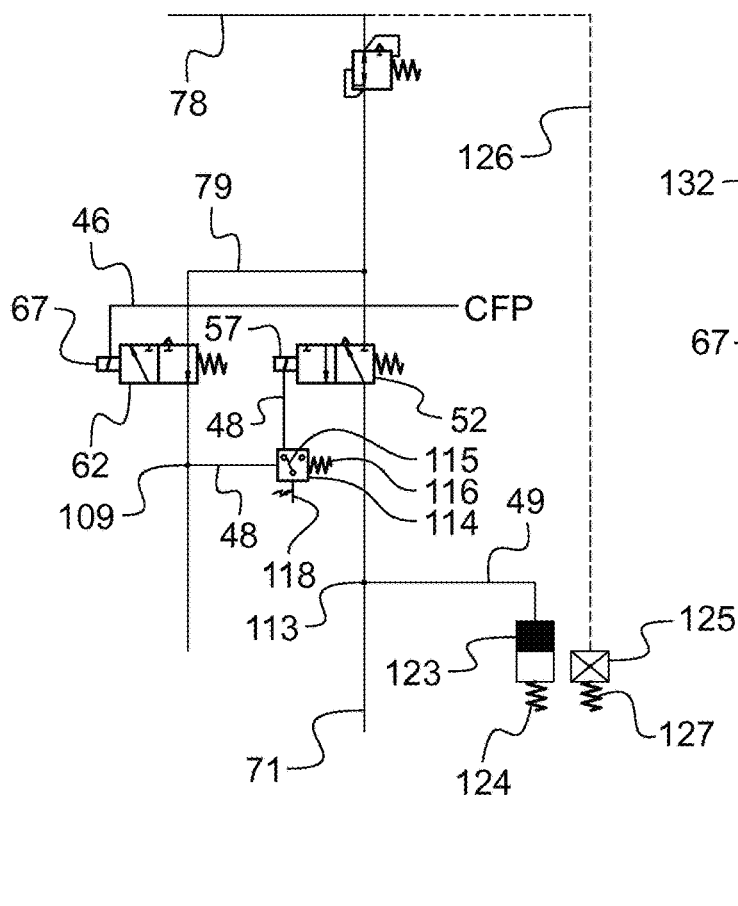
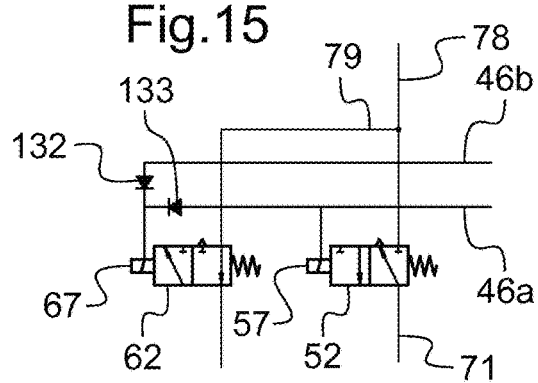
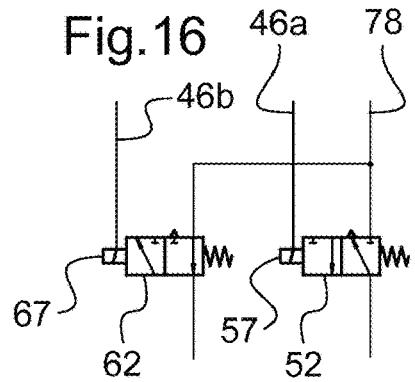

VEHICLE BRAKING SYSTEM AND BRAKING METHOD

FIELD OF THE INVENTION

The invention concerns the field of rail vehicle brakes.

It more particularly concerns the rail vehicle braking systems provided with a service brake and with a parking brake configured to act on a braking linkage.

It also concerns the braking methods for rail vehicles comprising such braking systems.

TECHNOLOGICAL BACKGROUND

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting (or draining) or leakage of the pneumatic system. This actuator, also termed parking brake, makes it possible to provide braking by virtue of the load of a spring substituting for the load of the fluid. Once this parking brake has been activated, the brake remains continuously engaged.

A rail vehicle braking system is known from European patent application EP 2 154 040 which is provided with a parking brake actuator coupled to a rail service brake cylinder. This brake cylinder comprises a body and a piston which is movable relative to the body to act on the braking linkage via a thrust rod.

The brake cylinder also comprises a pressure chamber delimited by the piston and by the body and which is connected by a pipe to a source of pneumatic pressure agent to put the piston into a service braking position.

The parking brake comprises a body which is distinct from the brake cylinder body. The body of the parking brake has an opening facing the piston of the service brake cylinder, which opening slidingly receives a thrust sleeve fitting into that opening in a fluid-tight manner.

The parking brake also comprises a piston movably mounted in a cylinder attached to the body and delimiting with that body a parking brake pressure chamber. This parking brake pressure chamber is connected to another source of pneumatic pressure agent via a pipe. The piston comprises at its center an aperture passed through by the thrust sleeve.

The parking brake further comprises springs which continuously bias the piston of that parking brake towards a position referred to as low in which the parking brake is considered as being in a working configuration.

To actuate the parking brake when the piston of the service brake cylinder is in service braking position, the pressure chamber of the parking brake (filled in advance with the pneumatic pressure agent) is vented and the springs of the parking brake then act on the piston of the parking brake, which drives the sleeve until the latter comes to bear against the piston of the service brake cylinder.

The pressure chamber of the service brake cylinder may then be vented since the parking brake has been actuated.

The load applied by the parking brake on the service brake piston is directly related to the load produced by the springs. This load naturally depends on the stiffness and the extension of those springs.

With this braking system, the force applied on the braking linkage by the piston of the service brake cylinder when the parking brake has been actuated and the service brake cylinder has been vented is often less than the force applied by that same piston when it is in service braking position.

SUBJECT OF THE INVENTION

The invention concerns a rail vehicle braking system, having improved performance relative to the braking systems of the above-mentioned prior art, while being simple, convenient and economic.

According to a first aspect, the invention is thus directed to a rail vehicle braking system having brakes with at least one lining or at least one block, comprising a body, a braking linkage configured to act on at least one said brake, a service brake comprising a braking piston movable relative to said body to act on said braking linkage and delimiting with said body a service brake pressure chamber configured to be supplied by a first source of pneumatic pressure agent to place said braking piston in a service braking position, as well as a parking brake configured to act on said braking piston of said service brake and having a working configuration and a resting configuration;

said parking brake comprising a blocking device movable relative to said body to act on said braking piston and having a first position and a second position in which said blocking device is configured to immobilize said braking piston in service braking position, said parking brake then being in working configuration, and a control device movable relative to said body, delimiting with said body a parking brake pressure chamber configured to be supplied by a second source of pneumatic pressure agent, and having a locking position in which said control device is configured to hold said blocking device in its second position; and said rail vehicle braking system further comprising a dedicated first pneumatic distribution device which is formed by at least one first distributor provided with a movable slide having two positions, with a single inlet aperture connected to a source of supply of pneumatic pressure agents, with a single outlet aperture connected to said parking brake pressure chamber in order to supply it with said second pneumatic pressure agent or vent it to place said parking brake respectively in its resting and working configurations, and with an aperture opening into the atmosphere; as well as a dedicated second pneumatic distribution device which is formed by at least one second distributor provided with a movable slide having two positions, with a single inlet aperture connected to said source of supply of pneumatic pressure agents, with a single outlet aperture connected to said service brake pressure chamber in order to supply it with a third pneumatic pressure agent of which the pressure value is determined, so as to apply a determined braking force when said parking brake is in working configuration, and with an aperture opening into the atmosphere.

In the braking system according to the invention, the braking piston is immobilized in service braking position by the parking brake and in particular by its blocking device. This means that the braking piston may be immobilized in any position, which position is linked to the travel which that piston has travelled and that travel depends on the force applied in the service braking phase.

By the term immobilize is meant the fact that the force applied by the braking piston on the braking linkage in the working configuration of the parking brake does not reduce, or almost not.

A certain loss is however accepted linked to the retraction of the braking piston, in particular on the slight movement of the piston relative to the blocking device, at the time the service brake pressure chamber is vented. This loss is controlled and is defined by a very slight reduction in the force applied which is due in particular to the manufacturing tolerances both of the blocking device and of the braking piston. This reduction in the force applied on the braking linkage is here called losses on retraction. An acceptable value for these losses on retraction is at maximum of the order of 10% to 15% of the force applied by the service brake at the time the parking brake is actuated to be in working configuration.

The configuration of the braking piston and of the parking brake makes it possible in particular to dispense with the springs of the known braking systems described above which make it possible to apply the parking brake force on the braking linkage via the service brake cylinder piston. Thus, for the same force applied on the braking linkage when the parking brake is in working configuration, the braking system according to the invention is more compact than the aforementioned braking systems of the prior art, and also lighter.

It should be noted that the braking linkage advantageously has deformable arms of which the elasticity may substitute for that of the springs of the known braking systems described above.

It should be noted that the configuration of the parking brake is chosen such that the load applied directly by the blocking device to immobilize the braking piston is not generally greater than the load applied by the springs on the piston of the aforementioned braking systems of the prior art; while the force applied on the braking linkage when the parking brake of the system according to the invention is in working configuration is preferably at least equal to or even greater than that procured by the aforementioned braking systems of the prior art.

The braking system according to the invention may furthermore make it possible to momentarily supply the service brake pressure chamber with the third pneumatic pressure agent in order to increase the braking force applied to the braking linkage by the service brake piston. The braking force applied to the braking linkage when the parking brake is in its working configuration is therefore increased further by it.

The system according to the invention may thus make it possible to obtain service brake and parking brake braking forces greater than those obtained with the aforementioned braking systems of the prior art, simply, conveniently and economically, while affording particularly good safety provision.

The application of the parking brake and in particular the supply of the parking brake chamber as well as the supply of the service brake chamber, with respectively the second pneumatic pressure agent and the third pressure agent which is distinct from the first pressure agent, are particularly simple and convenient to implement here by virtue of the first and second distribution devices dedicated to the application of the parking brake.

The distributors of these dedicated first and second distribution devices may for example be formed by solenoid valves.

It will moreover be noted that the first pneumatic pressure agent generally makes it possible to supply the service brake pressure chamber when the parking brake is not in working configuration, to apply a service braking force, in accordance with a service brake setting. This same first pneumatic pressure agent may also make it possible to supply the service brake pressure chamber when the parking brake is not in working configuration, to apply an emergency braking force rather than a service braking force, in accordance with an emergency brake setting. It may be considered here that the emergency brake force is a service brake force which is modified by an emergency parameter.

According to preferred, simple, convenient and economical features of the system according to the invention:

the first distributor has a first position by default referred to as a safety position in which its single outlet aperture connected to said parking brake pressure chamber communicates with its aperture opening into the atmosphere, and the second distributor has a first position by default referred to as a safety position in which its single outlet aperture connected to the service brake pressure chamber communicates with its single inlet aperture connected to the source of supply of pneumatic pressure agents;

the first distributor has a first position by default referred to as an availability position in which its single outlet aperture connected to said parking brake pressure chamber communicates with its single inlet aperture connected to the source of supply of pneumatic pressure agents, and the second distributor has a first position by default referred to as an availability position in which its single outlet aperture connected to the service brake pressure chamber communicates with its aperture opening into the atmosphere;

at least one of said first distributor and of said second distributor is monostable and provided with an actuator configured to move the respective slide from its first position to its second position according to a control signal received by that actuator, and with a return member configured to bring the respective slide back from its second position to its first position without being acted upon by the actuator; and/or at least one of said first distributor and of said second distributor is bistable and provided with a first actuator configured to move the respective slide from its first position to its second position according to a first control signal received by that first actuator, and with a second actuator configured to move the respective slide from its second position to its first position according to a second control signal received by that second actuator;

said dedicated first pneumatic distribution device is formed by two first identical distributors which are mounted in series and said dedicated second pneumatic distribution device is formed by two identical second distributors which are mounted in series;

said system comprises a dedicated control device configured to control said first and second pneumatic distribution devices;

said control device of the first and second pneumatic distribution devices comprises a control line linked to each of these first and second pneumatic distribution devices and which is configured to convey at least one application setting of the parking brake;

said control line is directly linked to each of the first and second pneumatic distribution devices and configured to convey at least one application setting of the parking brake;

said control line is directly linked only to said second pneumatic distribution device and said control device further comprises a transmission line linking the single outlet aperture of the second distributor of said second pneumatic distribution device to the first pneumatic distribution device and a pressure switch interposed on said transmission line;

said control device of the first and second pneumatic distribution devices further comprises at least one conditional management system disposed on said control line upstream of said first and second pneumatic distribution devices and having a first state in which its authorizes the passage of the application setting of the parking brake by the control line to the first and second pneumatic distribution devices, and a second state in which it prohibits the passage of the application setting of the parking brake by the control line to the first and second pneumatic distribution devices;

said conditional management system is provided with a distributor having an inlet aperture connected to said source of supply of pneumatic pressure agents, an outlet aperture connected to the control line and an actuator controlled by at least one control signal representing at least one pressure value in a main or general pneumatic pipe of said rail vehicle braking system and/or a pressure value in the service brake pressure chamber;

said conditional management system is provided with a pressure switch interposed on said control line;

said system further comprises a dedicated detection device configured to detect the application of the parking brake;

said parking brake application detection device is configured to receive an information item representing the supply of the service brake pressure chamber by the third pneumatic pressure agent via said second pneumatic distribution device, and to receive an information item representing the venting of the parking brake pressure chamber via said first pneumatic distribution device;

said parking brake application detection device is formed by a first pressure switch disposed at an exit from said pneumatic distribution device and by a second pressure switch disposed at an exit from said first pneumatic distribution device and connected to said first pressure switch;

said parking brake application detection device is configured to process said information item representing the supply of the service brake pressure chamber by the third pneumatic pressure agent via said second pneumatic distribution device, and to control said first pneumatic distribution device;

said parking brake application detection device is formed by a first pressure switch disposed at an exit from said second pneumatic distribution device and connected to said first pneumatic distribution device, and by a detection member disposed at an exit from said first pneumatic distribution device;

said parking brake application detection device is configured to process said information item representing the supply of the service brake pressure chamber by the third pneumatic pressure agent via said second pneumatic distribution device and said information item representing the venting of the parking brake pressure chamber via said first pneumatic distribution device, and to trigger an indicator representing the application of the parking brake; and/or said system further comprises a dedicated test device configured to test the operation of the parking brake, which test device is provided with at least two test lines connected to said first and second pneumatic distribution devices, which test lines are independent or interconnected.

According to a second aspect, the invention also relates to a method of braking a rail vehicle, comprising a rail vehicle braking system as described above, comprising:

the step of controlling the dedicated first pneumatic distribution device to supply the parking brake pressure chamber with the second pneumatic pressure agent so as to place the parking brake in its resting configuration then optionally, the step of supplying the service brake pressure chamber with the first pneumatic pressure agent so as to place the braking piston in its service braking position; then simultaneously or successively whatever the order is, the steps of controlling the dedicated second pneumatic distribution device to supply the service brake pressure chamber with the third pneumatic pressure agent so as to apply a determined braking force and control the dedicated first pneumatic distribution device to vent the parking brake pressure chamber so as to place the parking brake in its working configuration.

The method according to the invention is particularly simple and convenient to implement, while also being particularly safe.

According to preferred, simple, convenient and economical features of the method according to the invention, it comprises in addition the steps of detecting at least one information item representing the supply of the service brake pressure chamber with the third pneumatic pressure agent and the venting of the parking brake pressure chamber, and of deducing therefrom an information item representing the application of the parking brake.

BRIEF DESCRIPTION OF THE DRAWINGS

The disclosure of the invention will now be continued with the description of embodiments, given below by way of non-limiting illustration, with reference to the accompanying drawings, in which:

FIGS. 7 to 10 represent variant embodiments of the control device of the first and second pneumatic distribution devices, illustrated in FIG. 2;

FIGS. 11 to 14 represent variant embodiments of the parking brake application detection device, illustrated in FIG. 2; and FIGS. 15 and 16 represent different parking brake test devices which the control and actuation unit illustrated in FIG. 2 may comprise.

DETAILED DESCRIPTION OF AN EMBODIMENT

Figure 1:
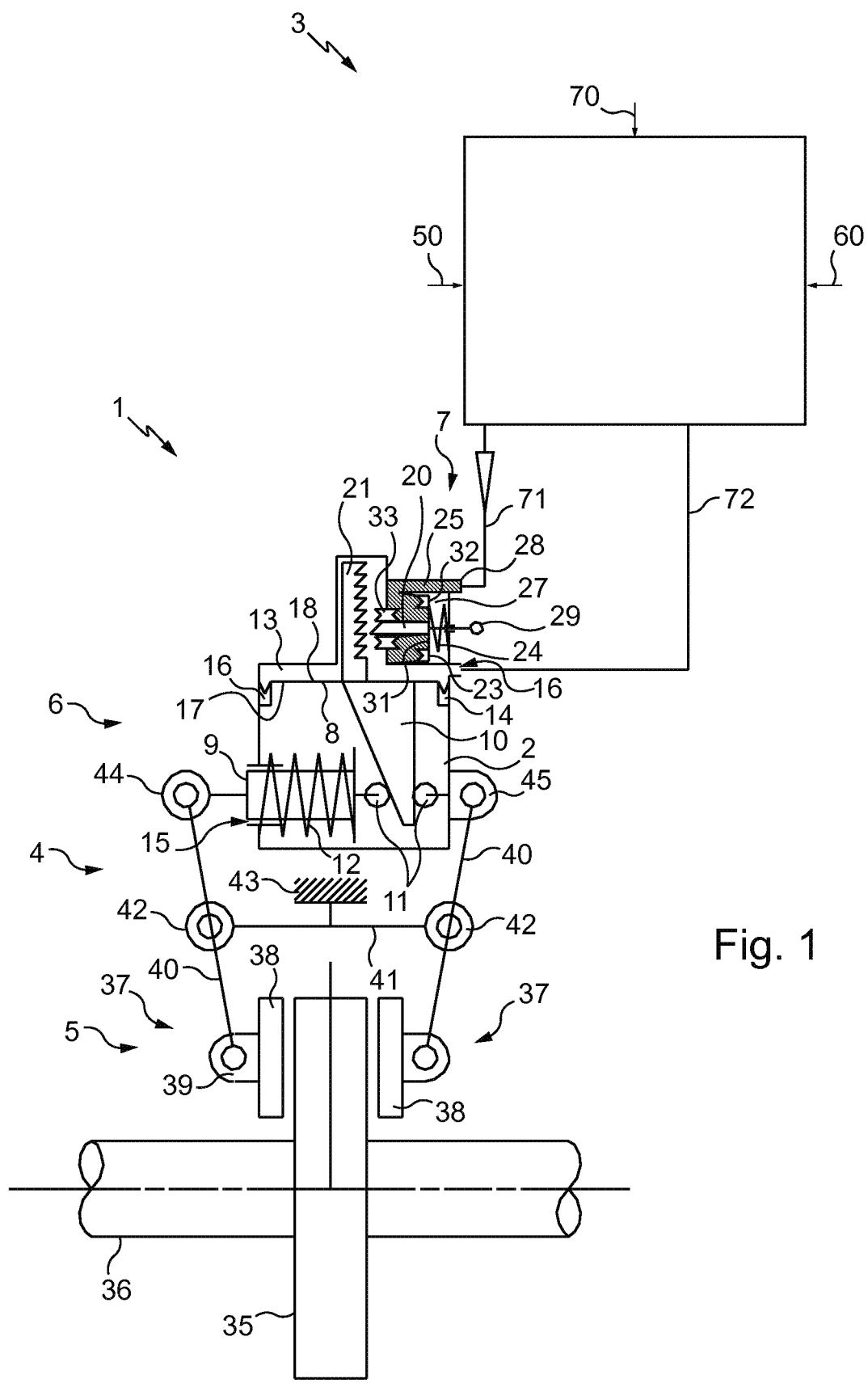
FIG. 1 diagrammatically and partially illustrates a rail vehicle braking system in accordance with a first embodiment of the invention, which system is provided in particular with a service brake, with a parking brake and with a control and actuation unit.

FIG. 1 diagrammatically represents a rail vehicle braking system 1 for a rail vehicle with a brake having linings or blocks.

The rail vehicle braking system 1 comprises a body 2 here forming a cylinder of a service brake 6 and a parking brake 7, a control and actuation unit 3 configured to manage the operation of the service brake 6 and of the parking brake 7, a conveyance network of pneumatic pipes that is connected to the body 2 and to the control and actuation unit 3, a braking linkage 4 mechanically linked to the body 2 as well as a brake 5 with linings on which the braking linkage 4 is configured to act.

The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction.

Together with the body 2 the braking piston 8 delimits a service brake pressure chamber 13.

The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction.

The braking piston 8 is configured to move in the body 2 while maintaining the service brake pressure chamber 13 relatively fluid-tight thanks to a membrane 14, for example formed by a lip seal, disposed between that braking piston 8 and inside edges of the body 2.

The service brake 6 further comprises a wedge part 10 fastened to the first side 17 of the braking piston 8.

This wedge part 10 has a triangular section and is configured to cooperate with a set of rolling bearing stops 11, of which one of the rolling bearing stops is linked to the body 2 while the other of the rolling bearing stops is linked to the thrust rod 9.

This thrust rod 9 is provided with a wear adjuster configured to compensate for the wear of the linings of the brake 5 in order to avoid reduction of the braking force by excessive play (further to wear of the linings).

The service brake 6 further comprises a spring 12 here disposed around the thrust rod 9, between the rolling bearing stop which is linked to the latter and the inside edge of the body 2. This spring 12 is configured to return the stop which is linked to the thrust rod 9 against the wedge part 10.

The service brake 6 further comprises a first aperture 15 formed in the body 2 and configured to enable the movement of the thrust rod 9 through that first aperture 15.

The service brake 6 further comprises a second aperture 16 formed in the body 2 and opening into the service brake pressure chamber 13.

Figure 2:
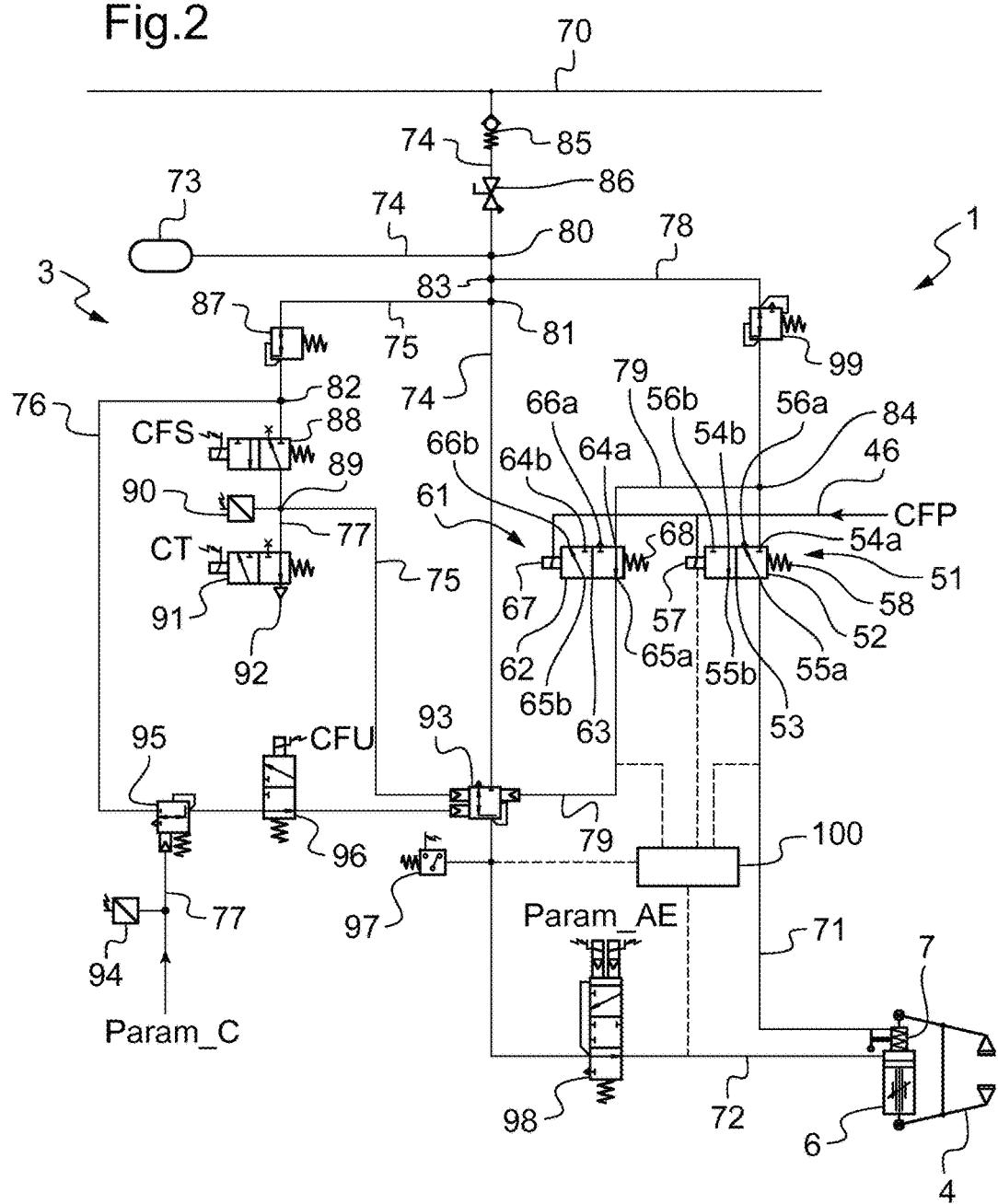
FIG. 2 diagrammatically represents in more detail the control and actuation unit illustrated in FIG. 1 and a conveyance network of pipes of the system which is connected to that unit, which unit is in particular provided with first and second pneumatic distribution devices connected to the parking brake, with a control device of these first and second pneumatic distribution devices and with a device for detection of the application of the parking brake.

The service brake pressure chamber 13 is connected here by a first supply pipe 72 of the conveyance network of pneumatic pipes, more generally called brake pipe, connected at the location of that second aperture 16, to a source of supply of pneumatic pressure agents 73 (visible in FIG. 2).

The body 2 comprises a cavity 27 situated against the service brake pressure chamber 13 and in which is disposed the parking brake 7.

The parking brake 7 comprises a blocking device here formed by a blocking finger 20 movable relative to the body 2 and extending in the second axial direction.

The parking brake 7 further comprises here a holding piston 23 movable relative to the body 2 and with the latter delimiting a parking brake pressure chamber 25.

This holding piston 23 has two sides, respectively a first side 31 on which is attached the blocking finger 20 and which is turned towards the parking brake pressure chamber 25, and a second side 32 which is an opposite side to the first side 31.

The parking brake 7 further comprises here a spring member 24 disposed between the body 2 and the second side 32 of the holding piston 23. This spring member 24 is configured to act on that holding piston 23 and therefore on the blocking finger 20.

It should be noted that the holding piston 23 and the spring member 24 here form a movable actuating device of the parking brake 7.

The holding piston 23 is configured to move in the body 2 while maintaining the parking brake pressure chamber 25 relatively fluid-tight thanks to a membrane (not referenced) disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture.

It should be noted that the relative sealing between the parking brake pressure chamber 25 and the service brake pressure chamber 13 is ensured by the presence of a seal 33 disposed at the interface between that third aperture and the blocking finger 20.

The parking brake 7 further comprises a fourth aperture 28 formed in the body 2 and opening into the parking brake pressure chamber 25.

This parking brake pressure chamber 25 is connected here by a second supply pipe 71 of the conveyance network of pneumatic pipes, also called parking brake pipe, which is connected at the location of that fourth aperture 28, to the source of supply of pneumatic pressure agents 73 (visible in FIG. 2).

The parking brake 7 further comprises an unlocking part 29 attached to the second side 32 of the holding piston 23 and opening outside the body 2 through a fifth aperture (not shown) formed in that body 2 and opening into the cavity 27; such that this unlocking part 29 is accessible to be manipulated from outside the body 2, if required.

It will be noted that this unlocking part 29 may comprise a visual indicator, for example a colored bellows, so as to visibly indicate the state of this part 29.

In a variant not illustrated, the unlocking part 29 may be coupled to the visual indication system provided with a switch mechanically connected to that part 29 and having a first position and a second position. This visual indication system is furthermore provided with an electricity supply line connected to the switch, with an elastic return member actuating the switch into its first position, and with a transfer line connected to the switch and extending to a visual indicator such as an indicator light. For example, when the unlocking rod 29 is not acted upon, the switch is actuated by the return member into its first position in which no electrical path is established between the electricity supply line and the transfer line, such that the indicator light is not supplied and is thus off; whereas when the unlocking rod 29 is acted upon, the switch is moved against the return member from its first position to its second position, in which an electrical path is established between the electricity supply line and the transfer line, such that the indicator light is supplied and is thus on to indicate that the braking piston is not held in position. Of course, the inverse operation is possible (the light would be on when the braking piston is held).

The service brake 6 is disposed in the body 2 and is configured to act on the brake 5 via the braking linkage 4.

This brake 5 comprises a brake disk 35 (here viewed from above) mounted for example on a rail vehicle axle 36, or directly on the wheel to brake.

This brake 5 further comprises two shoes 37 each provided with a lining 38 configured to be applied in contact with the disk 35 to reduce its rotational speed and therefore that of the wheel to brake, as well as a fastening eye 39 provided at the remote opposite location to the surface of the lining 38 that is configured to be applied to the disk brake 35.

The braking linkage 4 comprises two or four deformable levers 40 each provided with an upper portion and a lower portion which are attached to each other. Only two levers are illustrated here and, in the case of the linkage having four levers, they may be attached in pairs or as a variant be independent from each other.

Each portion of the levers 40 is jointed to a central connector 41 via two pivots 42.

The lower portion of each deformable lever 40 is linked to one of the shoes 37 via its fastening eye 39.

The upper portion of each deformable lever 40 is linked to a respective joint 44, 45.

The braking linkage 4 receives the body 2 between the upper portions of the deformable levers 40, at the location of the joints 44 and 45.

The body 2 is rotatably mounted on the joint 44 which is attached to an end of the thrust rod 9 whereas it has a fixed mounting to the joint 45, which is directly attached to that body 2.

The braking linkage 4 also comprises a fastening lug 43 joined to the central connector 41 for the mounting of that braking linkage 4 on the rail vehicle; in order for the brake shoes 37 to be situated on respective opposite sides of the brake disk 35 (or of the wheel of the rail vehicle).

It should be noted that the coming towards each other of the joints 44 and 45 enables the shoes 37 to move apart from each other and that conversely, the separation of those joints 44 and 45 enables the shoes 37 to be to clamped onto the brake disk 35 (or onto the rail vehicle wheel).

The control and actuation unit 3 is connected to the service brake pressure chamber 13 via the first supply pipe 72 to which it is connected; while that unit 3 is also connected here to the parking brake pressure chamber 25 via the second supply pipe 71 to which it is connected. Furthermore, this unit 3 is supplied with pneumatic agents by a main pipe 70 which passes generally along the rail vehicle.

The control and actuation unit 3 comprises system members (not shown) which are configured to receive and process representational information relative to operational settings of the rail vehicle, by a first electrical and/or pneumatic and/or manual type channel, denoted 50 in FIG. 1.

These system members are furthermore configured to receive and process representational information relative to parameters of use of the rail vehicle, by a second channel of electrical and/or pneumatic and/or manual type, which is denoted 60 in FIG. 1.

These system members may for example be formed by pneumatic relays and/or solenoids and/or pressure switches and/or sensors and/or pressure reducing valves and/or electrical relays and/or electronic cards and/or central processing units or microprocessors, and/or random access memory components comprising registers adapted to record variables of the parameters created and modified during the execution of programs, and/or communication interfaces configured to send and receive data, and/or internal storage members, such as hard disks, able in particular to store the executable code of programs enabling the management of the service and parking brakes 6 and 7.

It will be noted that in FIG. 1, the control and actuation unit 3 is associated with a braking linkage 4 and with a single brake 5 of the rail vehicle. As a variant, such a control and actuation unit may be associated with an axle (not shown) of the rail vehicle, provided with a plurality of brakes 5, or with a bogie (not shown) of the rail vehicle, provided with two or more axles, or for instance with a wagon (not shown) of the rail vehicle, provided with two bogies, or it is possible for the rail vehicle to comprise only one control and actuation unit.

FIG. 2 diagrammatically represents in more detail the conveyance network of pneumatic pipes and the control and actuation unit 3.

The main pipe 70 forms the channel for conveyance of a pneumatic agent distributed in the conveyance network of pneumatic pipes. The agent in this main pipe 70 is for example at a pressure value of approximately 9 bars.

The network may comprise what is referred to as a general pipe (not shown), distinct from the main pipe 70, and generally extending in parallel thereto. The general pipe also enables pneumatic continuity to be ensured along the rail vehicle and may authorize the service braking of the vehicle, by directly using the fluid passing through the general pipe. The main pipe 70, and possibly even the general pipe, enable equipment particularly for example of the rail vehicle braking system to be supplied, and in particular the source of supply of pneumatic pressure agents 73 here formed by what is referred to as an auxiliary reservoir.

This network further comprises, as described in more detail below, a filling and distribution pipe 74 which is tapped onto (that is to say directly connected to) the main pipe 70, a service brake pipe 75 connected by a tapping 81 onto the filling and distribution pipe 74, an emergency brake pipe 76 tapped onto the service brake pipe 75 by a tapping 82, as well as a control pipe 78 connected by a tapping 83 also onto the filling and distribution pipe 74.

The control pipe 78 is subdivided into two pipes at the location of a branch tapping 84, respectively into the parking brake pipe 71 directly communicating with the parking brake pressure chamber 25 and into an oversupply pipe, referred to hereinafter as preset pipe 79.

Each service brake pipe 75, emergency brake pipe 76 and preset pipe 79, joins the brake pipe 72 which directly communicates with the service brake pressure chamber 13.

The filling and distribution pipe 74 has a first filling section extending between the tapping (not shown) onto the main pipe 70 and the auxiliary reservoir 73, as well as a second distribution section extending from a tapping 80 onto the first section.

The control and actuation unit 3 here comprises a one-way valve 85 disposed on the first section of the filling and distribution pipe 74 near the tapping of the latter onto the main pipe 70, as well as an isolation tap 86 also disposed on that first section.

The non-return valve 85 enables the filling of the auxiliary reservoir 73 by the pneumatic pressure agent coming from the main pipe 70 and prohibits the venting of the reservoir 73 into the main pipe 70 if the pressure in the latter becomes less than that in the auxiliary reservoir 73.

The control and actuation unit 3 further comprises here a relay device 93, or pneumatic relay, supplied by the second distribution section of the filling and distribution pipe 74 and connected to the brake pipe 72.

This relay device 93 is configured to generate, from that second distribution section and from template values of pressure, a pressure of use at a determined throughput for the filling of the service brake pressure chamber 13.

These template values of pressure correspond here to service brake and emergency brake pressure settings and preset, respectively coming from the service brake pipe 75, the emergency brake pipe 76 and from the preset pipe 79.

The control and actuation unit 3 here further comprises, on the service brake pipe 75, a pressure reducing valve 87 configured to limit the pressure value for example here to approximately 4 bars as well as a distribution device 88 here formed by a monostable solenoid valve and configured to receive a control signal corresponding to a service brake setting CFS.

When the setting value CFS is null, the distribution device 88 is configured to interrupt the service brake pipe 75; and when the setting value CFS is not null, the device 88 is configured to authorize the passage of a pneumatic pressure agent, called first pressure agent, to the relay device 93 which receives a service brake pressure template value and which generates a service brake pressure to supply the service brake pressure chamber 13 for the braking of the vehicle.

The control and actuation unit 3 further comprises a pressure sensor 90 connected to a tapping 89 onto the service brake pipe 75 and which makes it possible to control the service brake pressure template value.

The control and actuation unit 3 further comprises a venting solenoid valve 91 connected by the tapping 89 onto the service brake pipe 75 and which makes it possible to vent that pipe via a venting aperture 92 on that solenoid valve 91.

The solenoid valve 91 is monostable and configured to receive a control signal corresponding to a work setting CT and to operate in reverse.

When the setting value CT is not null, the solenoid valve 91 is configured to interrupt the communication of the service brake pipe 75 with the venting aperture 92; and when the setting value CT is null, that solenoid valve 91 is configured to allow the communication of that pipe 75 with that venting aperture 92.

The control and actuation unit 3 further comprises here, on the emergency brake pipe 76, a distribution device 96 formed here by a monostable solenoid valve operating in reverse and configured to receive a control signal corresponding to an emergency brake setting CFU.

When the setting value CFU is not null, the distribution device 96 is configured to interrupt the emergency brake pipe 76; and when the setting value CFU is null, the device 96 is configured to authorize the passage of a pneumatic pressure agent to the relay device 93 which receives an emergency brake pressure template value and which generates an emergency brake pressure to supply the service brake pressure chamber 13 for the braking of the vehicle.

The control and actuation unit 3 further comprises a pressure limiter 95 (or pressure reducing valve) on the emergency brake pipe 76 upstream of the distribution device 96, which limiter 95 is controlled according to a load parameter param_C of the vehicle received via a load pipe 77 connected to the limiter 95; and a pressure sensor 94 tapped onto the load pipe 77.

The load parameter param_C is an information item representing the vehicle load and may for example concern a single wagon, or several successive wagons or the entirety of the rail vehicle. This depends on the number of braking systems in accordance with the invention and the strategy of brake actuation.

It will furthermore be noted that certain parameters of operation of certain rail vehicles may naturally (or initially) be dependent on the vehicle load for example to manage the service brake whereas others are not dependent on the vehicle load.

The control and actuation unit 3 comprises on the brake pipe 72, a pressure switch 97 downstream of the relay device 93 and configured to check whether or not a pneumatic pressure agent, has a pressure value at least greater than a predetermined threshold value, in the brake pipe 72 and therefore whether there is a pressure in the service brake pressure chamber 13.

The control and actuation unit 3 further comprises on the brake pipe 72 an anti-wheel-slide device 98 here formed by a monostable solenoid valve and configured to receive control signals which correspond to anti-wheel-slide parameters Param_AE of the vehicle; so as to ensure the effectiveness of the rail vehicle braking.

These anti-wheel-slide parameters Param_AE are information items representing the anti-wheel-slide or the wheel-slide of the vehicle and may for example correspond to the load of the vehicle, to its speed of locomotion as well as to the service and/or emergency brake template values.

The control and actuation unit 3 comprises on its control pipe 78 a pressure reducing valve 99 configured to limit the pressure value for example here to approximately 6 bars.

The control and actuation unit 3 comprises a dedicated first pneumatic distribution device 51 on its parking brake pipe 71 and a dedicated second pneumatic distribution device 61 on its preset pipe 79.

The first pneumatic distribution device 51 is formed by a first distributor 52, here monostable, also called solenoid valve, provided with a movable slide 53 with two positions, with a single inlet aperture 54 (denoted 54a or 54b in the drawings) connected to the control pipe 78, with a single outlet aperture 55 (denoted 55a or 55b in the drawings) connected to the parking brake pipe 71, and with an aperture 56 (denoted 56a or 56b in the drawings) opening into the atmosphere.

The first distributor 52 is furthermore provided with an actuator 57 configured to move the slide 53 from its first position to its second position according to a control signal received by that actuator 57, and with a return member 58 configured to bring the respective slide 53 back from its second position to its first position without being acted upon by the actuator 57.

The second pneumatic distribution device 61 is formed by a second distributor 62 which is monostable here, or solenoid valve, provided with a movable slide 63 which has two positions, with a single inlet aperture 64 (denoted 64a or 64b in the drawings) connected to the control pipe 78, with a single outlet aperture 65 (denoted 65a or 65b in the drawings) connected to the brake pipe 72 via the preset pipe 79 and the relay device 93, and with an aperture 66 (denoted 66a or 66b in the drawings) opening into the atmosphere.

The second distributor 62 is furthermore provided with an actuator 67 configured to move the slide 63 from its first position to its second position according to a control signal received by that actuator 67, and with a return member 68 configured to bring the respective slide 63 back from its second position to its first position without being acted upon by the actuator 67.

The control and actuation unit 3 further comprises a dedicated control device configured to control the first and second pneumatic distribution devices 51 and 61.

This control device of the first and second pneumatic distribution devices here comprises a control line 46 directly linked to the actuators 57 and 67 of the first and second pneumatic distribution devices 51 and 61 and configured to convey a parking brake application setting CFP.

When the parking brake application setting CFP is null, this means that the parking brake 7 must be applied here. This is what is referred to as a security application.

According to requirement, the first distributor 52 has a first so-called safety position by default in which its single outlet aperture 55a connected to the parking brake pressure chamber 25 via the parking brake pipe 71 communicates with its aperture opening into the atmosphere 56a, whereas its single inlet aperture 54a connected to the auxiliary reservoir 73 via the control pipe 78 and the supply and distribution pipe 74 is obturated.

The parking brake pressure chamber 25 is then vented and the blocking finger 20 comes to immobilize the rod 21 of the piston 8. The parking brake is applied.

As regards the second distributor 62, this has a first position by default which is also referred to as a safety position, in which its single outlet aperture 65a connected to the service brake pressure chamber 13 via the brake pipe 72 communicates with its single inlet aperture 64a connected to the auxiliary reservoir 73 via the control pipe 78 and via the supply and distribution pipe 74, whereas its aperture 66a to the atmosphere is obturated.

The second distributor 62 thus authorizes the passage of a pneumatic pressure agent, referred to as third pressure agent, to the relay device 93 which receives a preset pressure template value and which generates a preset pressure to supply the service brake pressure chamber 13 via the brake pipe 72.

To remove the application of the parking brake 7, a non-null setting for application of the parking brake CFP passes in the control line 46 to the actuators 57 and 67 which move the slides 53 and 63 of the first and second distributors 52 d 62 against the return members 58 and 68.

If required, the first distributor 52 has a second position in which its single outlet aperture 55b connected to the parking brake pressure chamber 25 via the parking brake pipe 71 communicates with its single inlet aperture 54b connected to the auxiliary reservoir 73 via the control pipe 78 and the supply and distribution pipe 74, whereas its aperture opening into the atmosphere 56b is obturated.

The first distributor 52 thus authorizes the passage of a pneumatic pressure agent, referred to as second pressure agent, directly to the parking brake pressure chamber 25 via the parking brake pipe 71. The blocking finger 20 is then withdrawn into that chamber and releases the rod 21 of the piston 8.

As regards the second distributor 62, this has a second position in which its single outlet aperture 65b is connected to its aperture 66b open to the atmosphere, whereas its single inlet aperture 64b connected to the auxiliary reservoir 73 via the control pipe 78 and the supply and distribution pipe 74 is obturated.

The second distributor 62 thus prohibits the passage of the third pneumatic pressure agent to the relay device 93 which thus does not receive the preset pressure template value and which vents the preset pressure if required.

The control and actuation unit 3 further comprises a dedicated detection device 100 configured to detect the application of the parking brake 7.

This detection device 100 for the application of the parking brake 7 is configured to receive an information item representing the supply of the service brake pressure chamber 13 by the third pneumatic pressure agent via the second distributor 62, and to receive an information item representing the venting of the parking brake pressure chamber 25 via the first distributor 52.

For this, the detection device 100 may comprise a first pressure sensor (not shown) tapped on the parking brake pipe 71, between the first distributor 52 and the parking brake pressure chamber 25 (dashed line in FIG. 2); as well as a second pressure sensor (not shown) tapped either on the preset pipe 79 between the second distributor 62 and the relay device 93, or on the brake pipe 72 between the service brake pressure chamber 13 and the anti-wheel-slide device 98 (dashed lines in FIG. 2) or between the latter and the relay device 93.

As a variant, the second sensor could be tapped on the brake pipe 72 between the service brake pressure chamber 13 and the relay device 93.

Still as a variant, at least one of the first and second sensors could be replaced by one or more pressure switches, connected on the parking brake pipe 71 and/or on the preset pipe 79 and/or on the brake pipe 72.

What is more, the first and second sensors and/or pressure switches may be independent from each other or may be interconnected (see below with reference to FIGS. 11 to 13).

Figure 3:
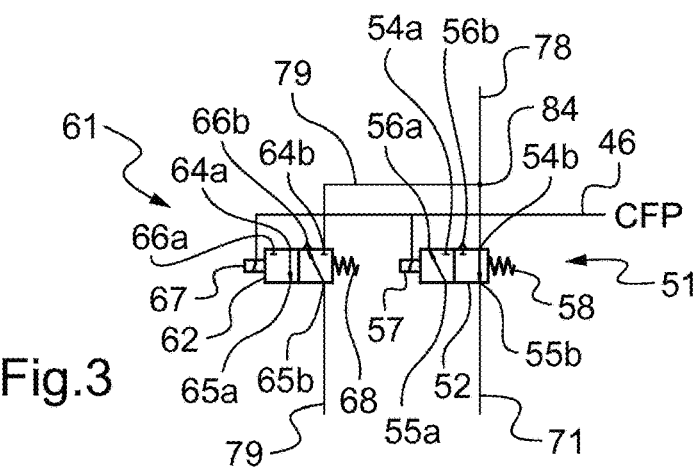
FIGS. 3 to 6 represent variant embodiments of the first and second distributor devices illustrated in FIG. 2.

FIG. 3 represents a variant embodiment of the distributors 52 and 62, which, here, are configured such that the parking brake 7 must not be applied when the application setting of the parking brake CFP is null. This is what is referred to as an availability application.

The difference relative to the distributors illustrated in FIG. 2 lies in the fact that the first and second respective positions are swapped.

In other words, when the application setting of the parking brake CFP is null, the first distributor 52 has a first position by default referred to as an availability position in which its single outlet aperture 55b connected to the parking brake pipe 71 communicates with its single inlet aperture 54b connected to the control pipe 78, whereas its aperture opening into the atmosphere 56b is obturated (FIG. 3).

As regards the second distributor 62, this has a first position by default also referred to as an availability position in which its single outlet aperture 65b communicates with its aperture 66b open to the atmosphere, whereas its single inlet aperture 64b connected to the control pipe 78 is obturated (FIG. 3).

On the contrary, when the application setting of the parking brake CFP is not zero, the first distributor 52 has a second position in which its single outlet aperture 55a communicates with its aperture opening into the atmosphere 56a, whereas its single inlet aperture 54a is obturated; and as regards the second distributor 62, this has a second position in which its single outlet aperture 65a communicates with its single inlet aperture 64a, whereas its aperture 66a open to the atmosphere is obturated.

Figure 4:
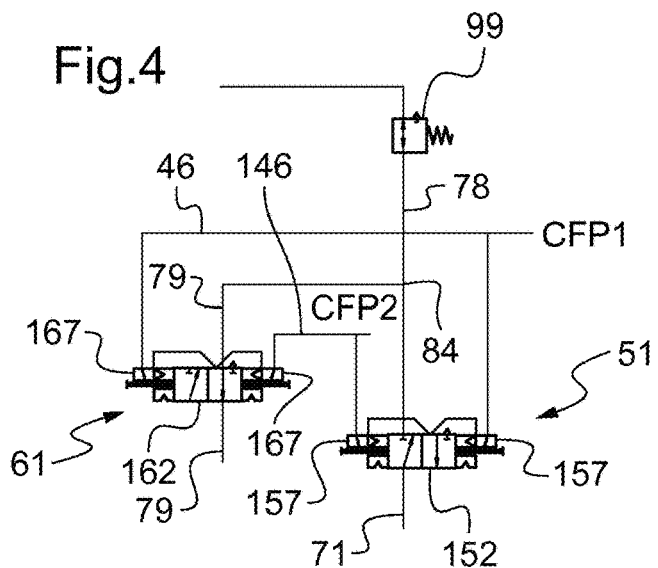

FIG. 4 represents a variant embodiment of the first and second distribution devices 51 and 61 in which the first and second distributors 152 and 162 are bistable here rather than monostable.

If required, the first and second distributors 152 and 162 are each provided with two actuators 157, 167 on respective opposite sides of the respective slides.

The control device of the first and second distribution devices 51 and 61 comprises, in addition to the control line 46 which is connected to one of the actuators 157, 167 of each of the first and second distributors 152 and 162, another control line 146, distinct from the control line 46, which is connected to the other of the actuators 157, 167 of each of the first and second distributors 152 and 162.

The control line 46 is configured to convey a first application setting of the parking brake CFP1 to place the slides of the first and second distributors 152 and 162 in their first respective position; whereas the other control line 146 is configured to convey a second application setting of the parking brake CFP2 to place the slides of the first and second distributors 152 and 162 in their second respective position.

Figure 5:
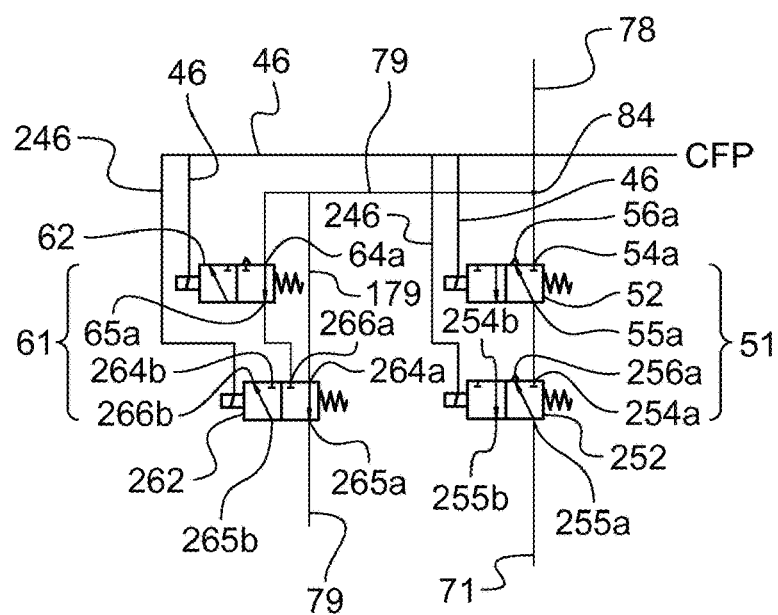

FIG. 5 represents a variant embodiment of the first and second distribution devices 51 and 61 in which the first and second distributors 52 and 62 are doubled by other first and second distributors 252 and 262 disposed in series with the first and second distributors 52 and 62.

In particular, in its first position, the first distributor 52 has its single inlet aperture 54a connected to the control pipe 78, its single outlet aperture 55a connected to a single inlet aperture 254a of the other first distributor 252 in its first position, which other first distributor 252 has its single outlet aperture 255a connected to the parking brake pipe 71.

In its first position, the second distributor 62 has its single inlet aperture 64a which communicates with its single outlet aperture 65a which is connected by an intermediate pipe to an obturated aperture 266a of the other second distributor 262, which has a single inlet aperture 264a connected by a branch pipe 179 to the preset pipe 79 and in communication with the single outlet aperture 265a.

It will be noted that, in its second position, the first distributor 52 has its single inlet aperture 54b communicating with its single outlet aperture 55b, which communicates with the single inlet aperture 254b of the other first distributor 252 in its second position, the single inlet aperture being connected to the control pipe 78, which single inlet aperture 254b communicates with the single outlet aperture 255b of the other first distributor 252; whereas in its second position, the second distributor 62 has its single inlet aperture 64b obturated and its single outlet aperture 65b communicating with the aperture 66b open to the atmosphere and the other second distributor 262 has its single inlet aperture 264b obturated and the single outlet aperture 265b communicating with its aperture 266b connected to the intermediate pipe.

Furthermore, the control line 46 has branch sections 246 to connect it to the respective actuators of the first and second distributors 252 and 262 in addition to being connected to the first and second distributors 52 and 62.

Figure 6:
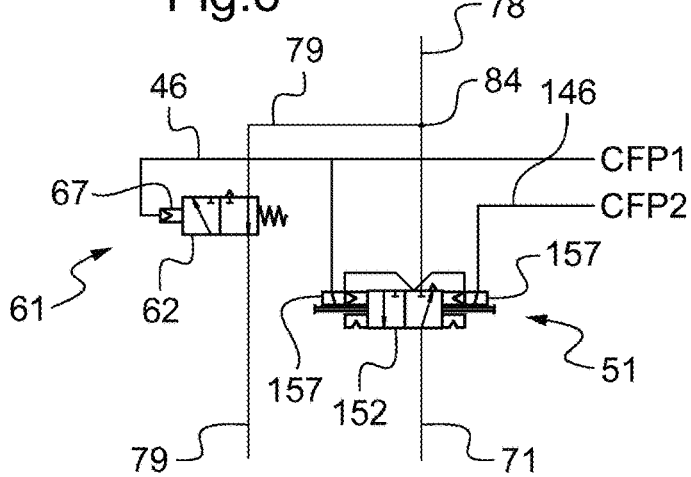

FIG. 6 represents a variant embodiment of the first and second distribution devices 51 and 61 in which the first distributor 152 is bistable here rather than monostable.

If required, the first distributor 152 is provided with two actuators 157 on respective opposite sides of the respective slide.

The control device of the first and second distribution devices 51 and 61 comprises, in addition to the control line 46 which is connected to the actuator 67 of the second distributor 62 and to one of the actuators 157 of the first distributor 152, another control line 146, distinct from the control line 46, which is connected to the other of the actuators 157 of the first distributor 152.

The control line 46 is configured to convey a first application setting of the parking brake CFP1 to place the slides of the first and second distributors 152 and 62 in their first respective position; whereas the other control line 146 is configured to convey a second application setting of the parking brake CFP2 to place the slide of the first distributor 152 in its second respective position. The operation of this variant may be deduced directly from the explanations provided above for FIGS. 2 and 5.

FIG. 7 represents a variant embodiment of the control device of the first and second distributors 52 and 62 illustrated in FIG. 2.

Here, the control line 46 is connected directly to the main pipe 70 such that the parking brake setting corresponds to a pressure value in that main pipe 70.

In other words, the triggering of the first and second distributors 52 and 62 to pass from the first position to the second position, and vice-versa, is made conditional upon a threshold value of pressure in the main pipe 70 which is defined by the return devices 58 and 68.

FIG. 8 represents another variant embodiment of the control device of the first and second distributors 52 and 62 illustrated in FIG. 2.

This control device, in addition to the control line 46, comprises a conditional management system disposed upstream of the first and second distributors 52 and 62 and has a first state in which it authorizes the passage of the parking brake application setting CFP by the control line 46 and a second state in which it prohibits the passage of the parking brake application setting CFP by the control line 46.

This conditional management system is provided here with a distributor 101 of the monostable solenoid valve type, having a movable slide with two positions controlled for example by control signals representing at least one value of pressure in the service brake pressure chamber 13 Param_PFS and/or a service brake setting CFS which act on the actuators 108, and by a return member 110.

In a first position, this distributor 101 has an inlet aperture 105a which is obturated and connected to a management pipe 103 connected by a tapping 104 to the control pipe 78 and an outlet aperture 106a communicating with an aperture 107a to the atmosphere.

In a second position, this distributor 101 has an inlet aperture 105b communicating with the outlet aperture 106b whereas the aperture 107b is obturated.

The conditional management system is furthermore provided with a pressure switch 102 interposed on the control line 46 between the outlet aperture of the distributor 101 and the first and second distributors 52 and 62.

This pressure switch 102 has a return member 111 as well as a switch 112 which, in the second position of the distributor 101, is acted upon by a pneumatic agent coming from the control pipe, against the return member 111; such that the control line 46 conveys the information item representing the parking brake setting CFP.

It will be noted that in FIG. 8, the first and second distributors 52 and 62 are in availability mode, as in FIG. 3.

FIG. 9 represents a variant embodiment of the conditional management system illustrated in FIG. 8, in which the only difference is that the distributor 101 is a single control distributor, in other words it is controlled by a single control signal here representing the pressure value in the main pipe 70. Parts bearing the same references are similar to those described with reference to FIG. 8 and the operation of this system may be deduced from the description made above with reference to FIGS. 7 and 8.

FIG. 10 represents another variant embodiment of the conditional management system, in which, as in FIG. 7, the control line 46 is connected to the main pipe 70 such that the parking brake setting corresponds to a pressure value in that main pipe 70 and the triggering of the first and second distributors 52 and 62 to pass from the first position to the second position, and vice-versa, is made conditional upon a threshold value of pressure in the main pipe 70. However, a pressure switch 102 similar to the pressure switch described with reference to FIG. 8 is interposed on the control line such that it is the pressure in the main pipe 70 which enables the switching of the switch 112 and thus the sending of the information item representing the parking brake setting CFP.

FIG. 11 represents a variant embodiment of the parking brake application detection device.

Here, the parking brake application detection device is formed by a first pressure switch 114 disposed at an exit from the second distributor 62 and connected to the latter by a first intermediate line 48 connected by a tapping 109 to the preset pipe 79; and by a second pressure switch 117 disposed at an exit from the first distributor 52 and connected to the latter by a second intermediate line 49 connected by a tapping 113 to the parking brake pipe 71.

The first pressure switch 114 and the second pressure switch 117 are interconnected by a continuation of the first intermediate line 48.

The first pressure switch 114 comprises a switch 115 which, when the second distributor 62 authorizes the passage of the third pneumatic pressure agent, receives the information and changes position, against a spring 116, to supply a first section of the second pressure switch 117 via a supply setting 118 and the continuation of the first intermediate line 48.

The first section of the second pressure switch 117 is provided with a switch 120 which switches and when the first distributor 52 authorizes the venting of the parking brake pressure chamber 25, a second section of the second pressure switch 117 receives the information which enables another switch 120 to switch, against a spring 119, and supply, by virtue of another supply setting 118, both a first indicator light 121 to indicate the detection of the application of the preset pressure and a second indicator light 121 to indicate the detection of the application of the blocking finger on the rod of the braking piston.

FIG. 12 represents a variant embodiment of the detection device illustrated in FIG. 11.

Contrary to the device illustrated in FIG. 11, the control line 46 is only connected, in FIG. 12, to the actuator 67 of the second distributor 62.

The device comprises a first pressure switch 114 identical to that of FIG. 12 but with the extension of the first intermediate line 48 which is connected to the actuator 57 of the first distributor 52 for the control of the latter. Here, the detection device thus also plays the role of control device for the first distributor 52.

When the second distributor 62 authorizes the passage of the third pneumatic pressure agent, the first pressure switch 114 receives the information item and moves its switch 115 for the supply by the supply setting 118 of the actuator 57.

The device comprises a second pressure switch 114, identical to the first pressure switch 114, disposed at an exit from the first distributor 52 and connected to the latter by a second intermediate line 49 connected by a tapping 113 to the parking brake pipe 71.

When the first distributor 52 authorizes the venting of the parking brake pressure chamber 25, the second pressure switch 117 receives the information and moves its switch 115 to send a parking brake application information item.

FIG. 13 represents a variant embodiment of the detection device illustrated in FIG. 12, which differs therefrom only in that the second pressure switch is replaced here by an indication unit 123 having two positions which is directly connected to the parking brake pipe 71 by the second intermediate line 49 and which is provided with a return spring 124.

According to the pressure in the parking brake pipe 71, the indication unit 123 (also called indicator) has one or the other of its positions to send a parking brake application information item.

Optionally, the detection device further comprises an indicator with a cross 125, directly connected to the auxiliary reservoir via the control pipe 78.

FIG. 14 illustrates a variant embodiment of the indication unit 123 visible in FIG. 14, in which it is associated with a pressure switch 114 (such as those described above) rather than with a return spring 124.

FIG. 15 represents a parking brake test device which the control and actuation unit 3 can comprise.

This is a first test line 46b provided with a first diode 132 and which meets a supply line 46a which is connected to the actuator 67 of the second distributor 62 and to the actuator 57 of the first distributor 52; and with a second diode 133 disposed on the supply line 46a.

The first test line 46b is configured to convey one or more test signals which may for example correspond to settings respectively of a test and application of the parking brake, in combination with the supply line 46a, which may also serve as a test line.

FIG. 16 represents a variant embodiment of the test device of the parking brake illustrated in FIG. 15.

This is a first supply and/or test line 46a connected solely to the actuator 57 of the first distributor 52 and conveying a parking brake venting signal; and a second supply and/or a test line 46b, independent from the first line 46a, connected to the actuator 67 of the second distributor 62 and conveying a preset signal.

In variants that are not illustrated:
the rail vehicle braking system may comprise a service brake lacking a wedge part attached to the braking piston, such that this piston acts directly on the thrust rod, which acts on the deformable levers; and in that case, the braking piston together with its notched rod and the thrust rod are movable in the second axial direction whereas the parking brake is configured such that the blocking finger and the holding piston are movable in the first axial direction;
the rail vehicle braking system has a braking linkage different from that illustrated in the Figures, in particular the braking linkage comprises a block configured to act directly on a wheel of the rail vehicle, that block being directly jointed by a pivot type joint fastened to the thrust rod, a rigid lever fastened to the body of the system as well as a deformable lever fastened both to the rigid lever and to the joint on the block; and/or
the rail vehicle braking system comprises a braking linkage configured to act on a brake having blocks as described above and is provided with a service brake with or without a wedge part attached to the braking piston.

It should be noted more generally that the invention is not limited to the examples described and represented.

The invention claimed is:

1. A vehicle braking system comprising:
   first brakes with at least one lining or at least one block, the at least one lining or the at least one block comprising a body;
   a braking linkage configured to act on at least one of the first brakes;
   a service brake comprising a braking piston movable relative to the body of the first brakes to act on the braking linkage and delimiting with the body of the first brakes;
   a service brake pressure chamber configured to be supplied by a first pneumatic pressure agent to place the braking piston in a service braking position;
   a parking brake configured to act on the braking piston of the service brake and having a working configuration and a resting configurations,
   the parking brake comprising a blocking device movable relative to the body to act on the braking piston and having a first position and a second position in which the blocking device is configured to immobilize the braking piston in the service braking position, with the parking brake in the working configuration;
   a control device movable relative to the body of the first brakes and delimiting with the body of the first brakes;
   a parking brake pressure chamber configured to be supplied by a second pneumatic pressure agent, the parking brake pressure chamber having a locking position in which the control device is configured to hold the blocking device in the second position;
   a dedicated first pneumatic distribution device formed by a first distributor provided with a first movable slide having two positions and having a single inlet aperture connected to a source of supply of pneumatic pressure agents, the first distributor also including a single outlet aperture connected to the parking brake pressure chamber to supply the parking brake pressure chamber with the second pneumatic pressure agent and place the parking brake in the resting configuration or vent the second pneumatic pressure agent to place the parking brake the working configuration, the first distributor also including an aperture opening into atmosphere; and
   a dedicated second pneumatic distribution device formed by at least one second distributor provided with a second movable slide having two positions, the second pneumatic distribution device having a single inlet aperture connected to the source of supply of the pneumatic pressure agents and a single outlet aperture connected to the service brake pressure chamber supply the service brake pressure chamber with a third pneumatic pressure agent of which a pressure value is determined to apply a determined braking force while the parking brake is in the working configuration, the second pneumatic distribution device including an aperture opening into the atmosphere,
   wherein the control device is configured to control the first and second pneumatic distribution devices, the control device including a control line that is linked to each of the first and second pneumatic distribution devices and is configured to convey at least one application setting of the parking brake, the control line directly linked only to the second pneumatic distribution device, wherein the control device also includes a transmission line linking the single outlet aperture of the second distributor of the second pneumatic distribution device to the first pneumatic distribution device and a pressure switch interposed on the transmission line.

2. The system according to claim 1, wherein the first distributor has a first safety position in which the single outlet aperture of the first distributor that is connected to the parking brake pressure chamber communicates with the aperture opening of the first distributor into the atmosphere, the second distributor having a second safety position in which the single outlet aperture of the second distributor that is connected to the service brake pressure chamber communicates with the single inlet aperture of the second distributor that is connected to the source of supply of the pneumatic pressure agents.

3. The system according to claim 1, wherein the first distributor has a first availability position in which the single outlet aperture of the first distributor that is connected to the parking brake pressure chamber communicates with the single inlet aperture of the first distributor that is connected to the source of supply of the pneumatic pressure agents, and the second distributor has a second availability position in which the single outlet aperture of the second distributor that is connected to the service brake pressure chamber communicates with the aperture opening of the second distributor into the atmosphere.

4. The system according to claim 1, wherein at least one of the first distributor or the second distributor is monostable and provided with an actuator configured to move the first movable slide or the second movable slide from -the first position to the second position of the first movable slide or the second movable slide according to a control signal received by the actuator, the at least one of the first distributor or the second distributor including a return member configured to bring the first movable slide or the second movable slide back from the second position to the first position without being acted upon by the actuator.

5. The system according to claim 1, wherein the dedicated first pneumatic distribution device is formed by two identical first distributors mounted in series and the dedicated second pneumatic distribution device is formed by two identical second distributors mounted in series.

6. The system according to claim 1, wherein the control line is directly linked to each of the first and second pneumatic distribution devices and is configured to convey at least one application setting of the parking brake.

7. A-The system according to claim 1, wherein the control device of the first and second pneumatic distribution devices further comprises at least one conditional management system disposed on the control line upstream of the first and second pneumatic distribution devices and having a first state in which the at least one conditional management system authorizes passage of the at least one application setting of the parking brake by the control line to the first and second pneumatic distribution devices, the at least one conditional management system having a second state in which the at least one conditional management system prohibits passage of the at least one application setting of the parking brake by the control line to the first and second pneumatic distribution devices.

8. The system according to claim 7, wherein the at least one conditional management system is provided with a distributor having an inlet aperture connected to the source of supply of the pneumatic pressure agents, an outlet aperture connected to the control line, and one or more of:
   an actuator controlled by at least one control signal representing at least one pressure value in a main or general pneumatic pipe; or
   a pressure value in the service brake pressure chamber.

9. The system according to claim 7, wherein the at least one conditional management system is provided with a pressure switch interposed on the control line.

10. The system according to claim 1, further comprising:
a dedicated detection device configured to detect application of the parking brake.

11. A-The system according to claim 10, wherein the detection device is configured to receive an information item representing supply of the service brake pressure chamber by the third pneumatic pressure agent via the second pneumatic distribution device, and to receive an information item representing venting of the parking brake pressure chamber via the first pneumatic distribution device.

12. The system according to claim 11, wherein the detection device is formed by a first pressure switch disposed at an exit from the second distributor and by a second pressure switch connected to the first pressure switch.

13. The system according to claim 10, wherein the detection device is configured to process an information item representing supply of the service brake pressure chamber by the third pneumatic pressure agent via the second pneumatic distribution device, and to control the first pneumatic distribution device.

14. The system according to claim 13, wherein the detection device is formed by a first pressure switch disposed at an exit from the second pneumatic distribution device and connected to the first pneumatic distribution device, and by a detection member disposed at an exit from the first pneumatic distribution device.

15. The system according to claim 10, wherein the detection device is configured to process an information item representing supply of the service brake pressure chamber by the third pneumatic pressure agent via the second pneumatic distribution device and the information item representing venting of the parking brake pressure chamber via the first pneumatic distribution device, and to trigger an indicator representing application of the parking brake.

16. The system according to claim 1, further comprising:
a test device configured to test operation of the parking brake, the test device including at least two independent or interconnected test lines connected to the first and second pneumatic distribution devices.

17. A method of braking a vehicle comprising the vehicle braking system according to claim 1, comprising:
controlling the dedicated first pneumatic distribution device to supply the parking brake pressure chamber with the second pneumatic pressure agent to place the parking brake in the resting configuration;
supplying the service brake pressure chamber with the first pneumatic pressure agent to place the braking piston in the service braking position; and
controlling the dedicated second pneumatic distribution device to supply the service brake pressure chamber with the third pneumatic pressure agent to apply a determined braking force and control the dedicated first pneumatic distribution device to vent the parking brake pressure chamber to place the parking brake in the working configuration.

18. The method according to claim 17, further comprising:
detecting a first information item representing supply of the service brake pressure chamber with the third pneumatic pressure agent and venting of the parking brake pressure chamber; and
deducing therefrom a second information item representing application of the parking brake.

19. The system according to claim 1, wherein at least one of the first distributor or the second distributor is bistable and provided with a first actuator and a second actuator, the first actuator configured to move the first movable slide or the second movable slide from the first position to the second position of the first movable slide or the second movable slide according to a first control signal received by the first actuator, the second actuator configured to move the first movable slide or the second movable slide from the second position to the first position of the first movable slide or the second movable slide according to a second control signal received by the second actuator.

20. A vehicle braking system comprising:
a first pneumatic distribution device having a first movable slide having first and second positions, the first pneumatic distribution device having a first inlet aperture connected to a source of pneumatic pressure agents, the first pneumatic distribution device also including a first outlet aperture connected to a parking brake pressure chamber to supply the parking brake pressure chamber with a first agent of the pneumatic pressure agents and place a parking brake in a resting configuration or vent the first agent to place the parking brake in a working configuration, the first pneumatic distribution device also including a first aperture opening into an atmosphere;
a second pneumatic distribution device having a second movable slide third and fourth positions, the second pneumatic distribution device having a second inlet aperture connected to the source of the pneumatic pressure agents and a second outlet aperture connected to a service brake pressure chamber to supply the service brake pressure chamber with a second agent of the pneumatic pressure agents of which a pressure value is configured to apply a braking force while the parking brake is in the working configuration, the second pneumatic distribution device including a second aperture opening into the atmosphere; and
a control device configured to control the first and second pneumatic distribution devices, the control device including a control line linked to the first and second pneumatic distribution devices and configured to convey an application setting of the parking brake, the control device also having a transmission line linking the second outlet aperture of the second pneumatic distribution device to the first pneumatic distribution device and a pressure switch interposed on the transmission line.

* * * * *